US010625632B2

(12) United States Patent
Jaradi et al.

(10) Patent No.: US 10,625,632 B2
(45) Date of Patent: Apr. 21, 2020

(54) ROTATABLE VEHICLE SEAT (71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US); Saeed David Barbat, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 70 days.

(21) Appl. No.: 16/129,444

(22) Filed: Sep. 12, 2018

(65) Prior Publication Data
US 2020/0079246 A1    Mar. 12, 2020

(51) Int. Cl.
*B60N 2/14*   (2006.01)
*B60N 2/10*   (2006.01)
*B60N 2/02*   (2006.01)

(52) U.S. Cl.
CPC .............. *B60N 2/143* (2013.01); *B60N 2/10* (2013.01); *B60N 2/146* (2013.01); *B60N 2002/022* (2013.01)

(58) Field of Classification Search
CPC .......... B60N 2/143; B60N 2/10; B60N 2/146; B60N 2002/022
See application file for complete search history.

(56) References Cited

U.S. PATENT DOCUMENTS

| 2,290,464 | A | * | 7/1942 | Buchheit | B60N 2/04 296/65.07 |
| 5,520,349 | A | * | 5/1996 | Kapanka | B60R 22/415 242/382.2 |
| 5,651,576 | A | * | 7/1997 | Wallace | A47K 3/001 248/425 |
| 5,720,462 | A | * | 2/1998 | Brodersen | B60N 2/143 248/425 |
| 5,890,764 | A | * | 4/1999 | Lee | B60N 2/0232 248/349.1 |
| 5,971,490 | A | | 10/1999 | Chang | |
| 6,557,919 | B2 | | 5/2003 | Suga et al. | |
| 7,350,866 | B2 | * | 4/2008 | Billger | B60N 2/0224 297/344.22 |
| 7,850,242 | B2 | * | 12/2010 | Taguchi | B60N 2/06 296/65.06 |

(Continued)

FOREIGN PATENT DOCUMENTS

| JP | 3928242 B2 | 6/2007 |
| JP | 5501284 B2 | 5/2014 |
| JP | 2017132366 A | 8/2017 |

OTHER PUBLICATIONS

Adient PLC, "Passenger Protection for Autonomous-Driving Vehicles", retrieved from Internet URL: https://www.adient.com/media/press-releases/2018/01/16/adient-showcases-passenger-protection-for-autonomous-driving-vehicles (3 pages).

*Primary Examiner* — Lori L Lyjak
(74) *Attorney, Agent, or Firm* — Frank MacKenzie; Bejin Bieneman PLC (57) ABSTRACT

A vehicle seating system includes a vehicle floor, a fixed ring fixed to the vehicle floor, a rotatable ring concentric with and rotatably supported by the fixed ring, a seat supported on the rotatable ring, and a retractor fixed to the rotatable ring.

18 Claims, 12 Drawing Sheets

(56) References Cited

U.S. PATENT DOCUMENTS

| | | | |
|---|---|---|---|
| 8,220,856 B2 * | 7/2012 | Horiguchi | B60N 2/14 296/65.01 |
| 8,544,809 B1 * | 10/2013 | Laurita | A47C 3/18 248/346.01 |
| 8,585,146 B1 * | 11/2013 | Giasson | B64D 11/0649 297/344.1 |
| 9,744,933 B1 | 8/2017 | Rao et al. | |
| 10,011,191 B2 * | 7/2018 | Reif | B60N 2/0244 |
| 2016/0272141 A1 | 9/2016 | Ohmura | |

* cited by examiner

ROTATABLE VEHICLE SEAT

BACKGROUND

Vehicles include seats to support occupants. The seats each include a seat back and a seat bottom. The seat bottom supports the occupant vertically. The seat back may rotate relative to the seat bottom. The seat may be movable in a vehicle fore-aft direction to accommodate the occupant's legs. The occupant may move the seat along a track to a specified position.

Vehicles include seatbelts for each of the seats. The seatbelt includes webbing that, when the seatbelt is buckled, passes across an occupant of the seat. An anchor attaches one end of the webbing to a seat frame. The other end of the webbing feeds into a retractor, which includes a spool that pays out and retracts the webbing. A tongue slides freely along the webbing and, when engaged with a buckle, divides the webbing into a lap band and a shoulder band. The seatbelt is typically a three-point harness, meaning that the webbing is attached at three points around the occupant when fastened: the anchor, the retractor, and the buckle.

DETAILED DESCRIPTION

A vehicle seating system includes a vehicle floor, a fixed ring fixed to the vehicle floor and a rotatable ring concentric with and rotatably supported by the fixed ring, a seat supported on the rotatable ring, and a retractor fixed to the rotatable ring.

The vehicle seating system may further include a bar fixed to the rotatable ring and the retractor is fixed to the bar. The rotatable ring may include a hole and the bar may extend across the hole. The vehicle seating system may further include a second bar transverse to the bar and fixed to the bar and the rotatable ring. The retractor may be beneath the seat.

One of the fixed ring and the rotatable ring may have a plurality of teeth and the other of the fixed ring and the rotatable ring may include a tab releasably engageable with the teeth. The tab may be designed to prevent movement of the rotatable ring relative to the fixed ring.

The vehicle seating system may further include a track supporting the seat on the rotatable ring, the seat being selectively slideable relative to the track.

One of the fixed ring and the rotatable ring may define a groove and the other of the fixed ring and the rotatable ring may include a pin extending into the groove.

The vehicle seating system may further include a webbing guide supported by the seat and a webbing extending from the retractor through the webbing guide.

The webbing guide may include a frame and a roller rotatably connected to the frame and the webbing may ride on the roller.

The vehicle seating system may further include a second webbing guide supported by the seat spaced from the webbing guide, the webbing extending through the second webbing guide. The seat may include a seat back having a top and a bottom, the webbing guide being supported by the top and a second webbing guide being supported by the bottom.

The vehicle seating system may further include a sleeve extending from the second webbing guide to the webbing guide, the webbing extending through the sleeve.

The seat back may include a front side designed to support an occupant and a back side opposite the front side, the webbing guide and the second webbing guide being supported by the back side. The webbing may extend from the webbing guide to the front side of the seat back.

The seat back may include a frame having a first member and a second member elongated vertically, and an occupant seating area between the first member and the second member, the webbing guide and the second webbing guide being supported by the first member.

The webbing may extend from the second webbing guide to the retractor in a vehicle-forward direction.

With reference to the Figures, wherein like numerals indicate like parts throughout the several views, a vehicle seating system 10, 10' of a vehicle 12 includes a vehicle floor 14, a fixed ring 16 fixed to the vehicle floor 14, a rotatable ring 18 concentric with and rotatably supported by the fixed ring 16, a seat 20 supported on the rotatable ring 18, and a retractor 22 fixed to the rotatable ring 18.

In a vehicle 12 with a rotatable seat 20, e.g., an autonomous vehicle 12, an occupant restraint controls the kinematics of the occupant during a vehicle impact and moves with the rotatable seat 20 when the rotatable seat 20 rotates. The occupant restraint includes webbing 24 attached at three points around the occupant when fastened: the retractor 22, a buckle 26, and an anchor 28. That is, the occupant restraint may be a three-point harness. The retractor 22 rotates with the rotatable seat 20, allowing the webbing 24 to control the kinematics of the occupant in all rotational positions of the rotatable seat 20. The rotatable ring 18 may support the seat 20 without significant changes to seat architecture.

During a vehicle impact, the retractor 22 locks to prevent or limit payout of webbing 24 from the retractor 22. The momentum of the occupant applies a load to the webbing 24. Since the retractor 22 is fixed to the rotatable ring 18, which is supported by the fixed ring 16 that is fixed to the vehicle floor 14, the webbing 24 transfers the load to the vehicle floor 14, decreasing the load applied to the seat 20 by the webbing 24. A webbing guide 30, 32 supported by the seat 20 routes the webbing 24 to prevent the webbing 24 from twisting or roping, for example, during a vehicle oblique impact that pulls the webbing 24 in both a vehicle-forward direction and a cross-vehicle direction.

Figure 1:
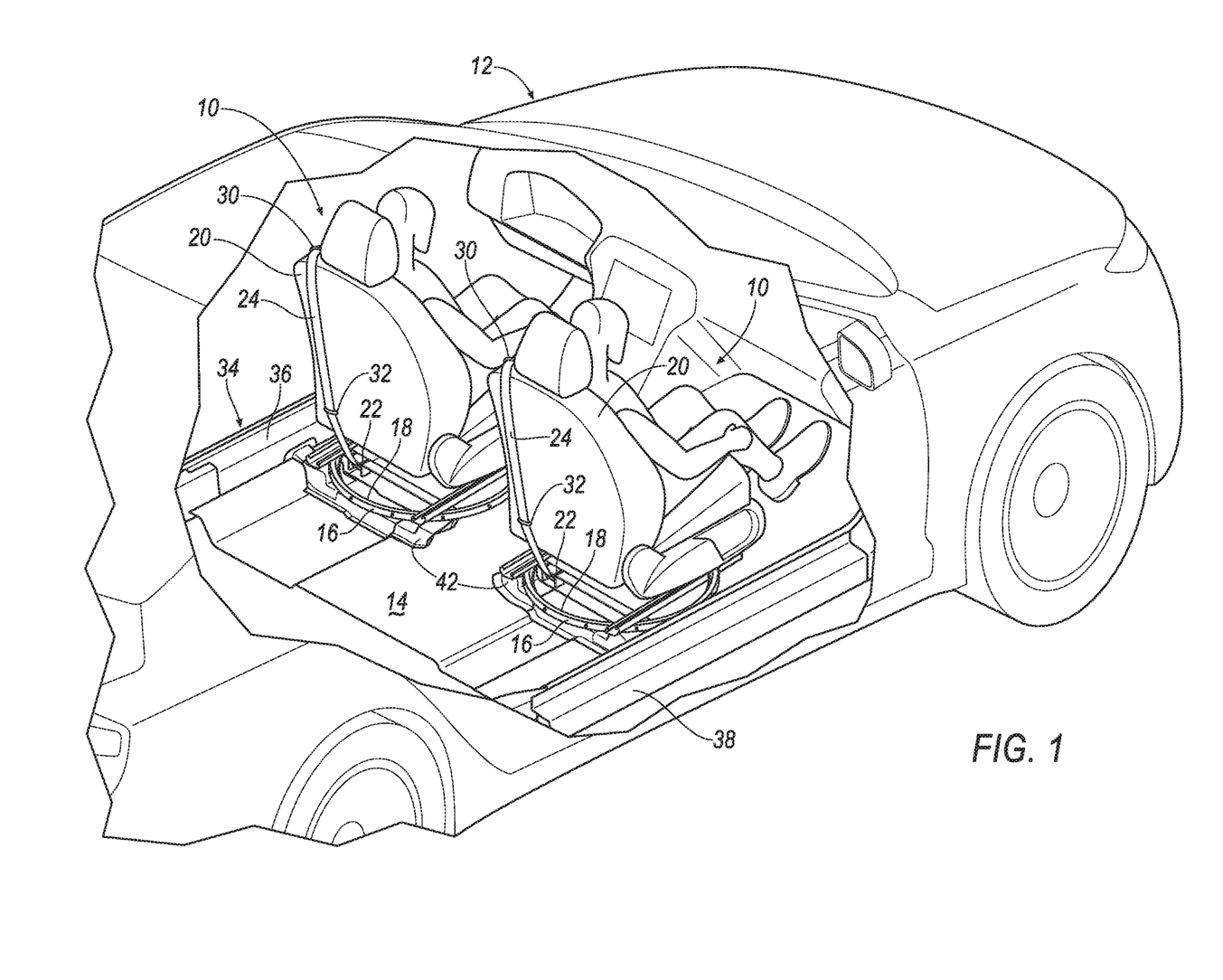
FIG. 1 is a perspective view of a vehicle.

As shown in FIG. 1, the vehicle 12 includes a body 34. The body 34 may be of a unibody construction. In the unibody construction, the body 34 is unitary, i.e., a continuous one-piece unit. As another example not shown in the Figures, the body 34 and a frame may have a body-on-frame construction (also referred to as a cab-on-frame construction). In other words, the body 34 and the frame are separate components, i.e., are modular, and the body 34 is supported on and affixed to the frame. Alternatively, the body 34 and the frame may have any suitable construction. The body 34 and/or the frame may be formed of any suitable material, for example, steel, aluminum, etc.

Figure 3A:
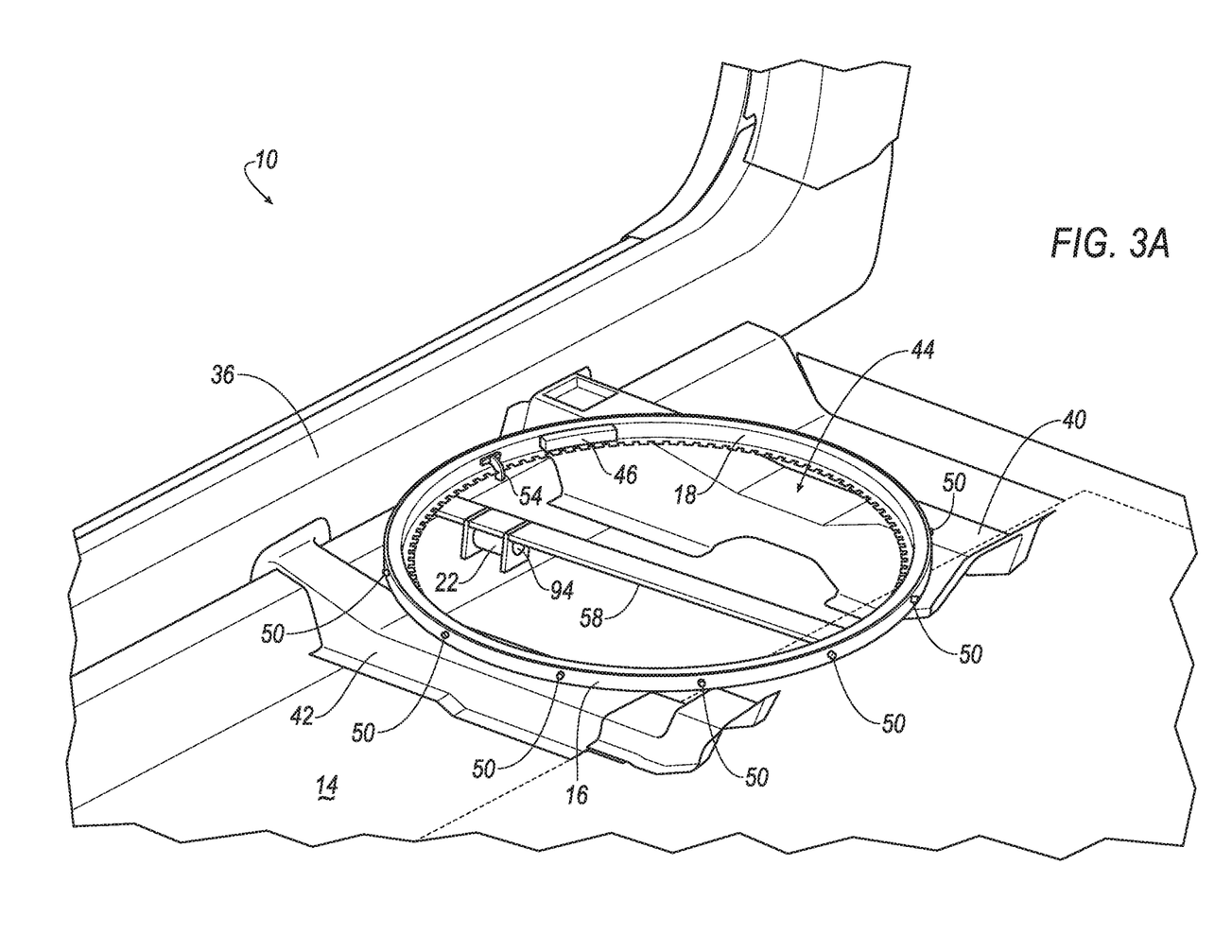
FIG. 3A is a perspective view of the rotatable ring, the fixed ring, and the bar extending across the rotatable ring.
Figure 3B:
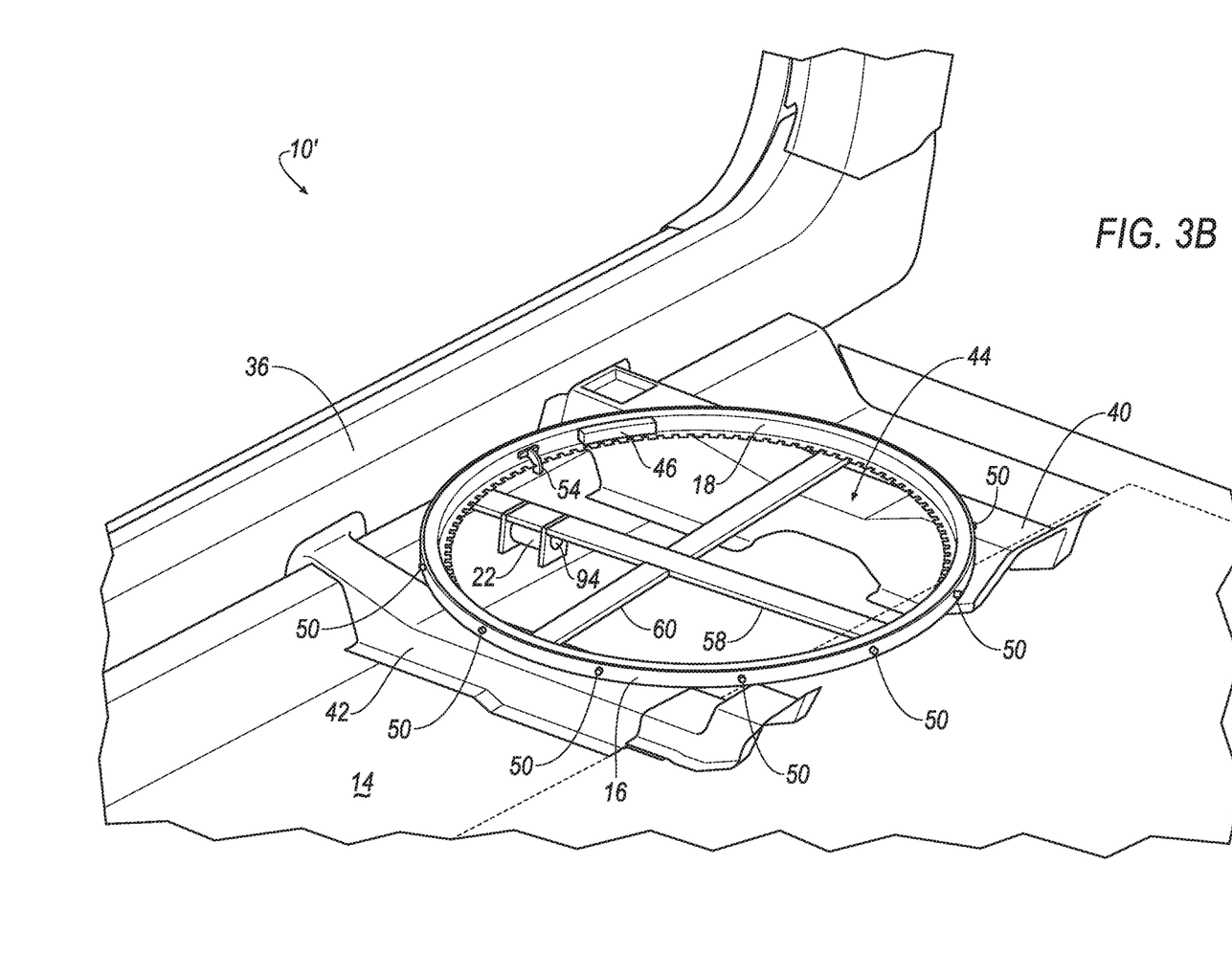
FIG. 3B is a perspective view of a second embodiment of the vehicle seating system including a second bar extending across the rotatable ring.

As shown in FIGS. 1, 3A-3B, the body 34 and/or frame of the vehicle 12 may include sills 36, 38. The sills 36, 38 are spaced from each other in a cross-vehicle direction and may be elongated in a vehicle fore-and-aft direction. The sills 36, 38 may be at the left-most and the right-most position of the body 34. In other words, the sills 36, 38 may be the outmost components of the body.

The vehicle 12 includes the vehicle floor 14, as shown in FIGS. 1-3B. The vehicle floor 14 may be supported by the sills 36, 38. Specifically, the vehicle floor 14 may extend from one sill 36, 38 to the other sill 36, 38. The vehicle floor 14 may be fixed to the sills 36, 38, i.e., the vehicle floor 14 has a direct connection to the sills 36, 38 and does not move relative to the sills 36, 38. The vehicle floor 14 may be fixed to the sills 36, 38 by, e.g., welding and/or fastening. The vehicle floor 14 may extend from a front of a passenger compartment of the vehicle 12 to a rear of the passenger compartment. The vehicle floor 14 may be a flat floor, e.g., lacking a tunnel, allowing the seat 20 to rotate without the occupant's legs contacting a tunnel disposed in the vehicle floor 14. The vehicle floor 14 may be metal, e.g., steel, aluminum, etc.

Figure 2:
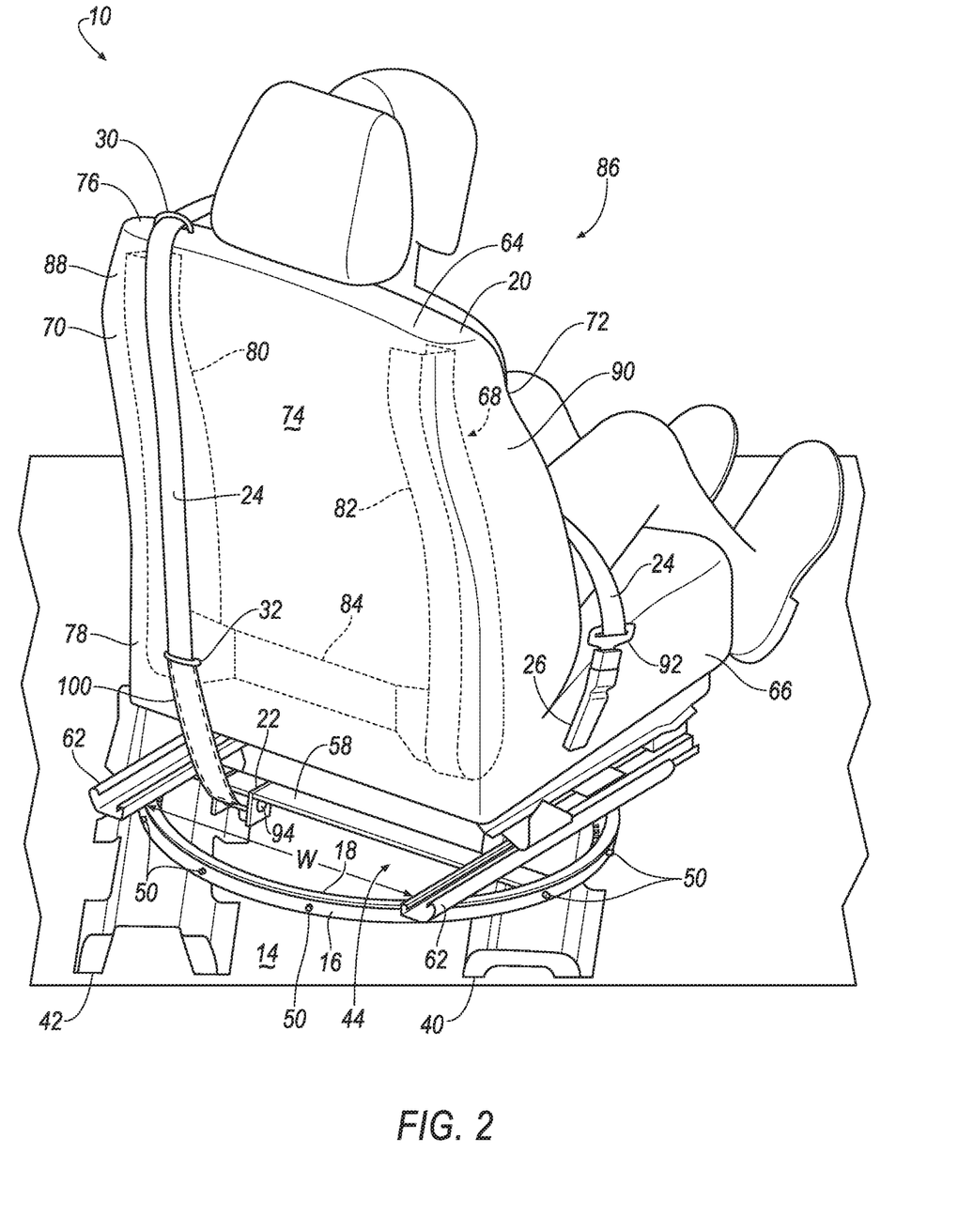
FIG. 2 is a perspective view of a vehicle seating system including a seat, a first webbing guide, a second webbing guide, a rotatable ring, a fixed ring, and a bar extending across the rotatable ring.

The vehicle floor 14 may include a seat cross member 40, as shown in FIGS. 2-3B. The seat cross member 40 may be positioned in the vehicle floor 14 to support the seat 20. The seat cross member 40 is elongated in a cross-vehicle direction. The seat cross member 40 may be fixed to the sills 36, 38, i.e., the seat cross member 40 may have a direct connection to the sills 36, 38 and may not move relative to sills 36, 38. The seat cross member 40 may be fixed to the sills 36, 38 by, e.g., welding and/or fastening.

In addition to the seat cross member 40, the vehicle floor 14 may include any suitable number of cross members elongated in a cross-vehicle direction and supported by the sills 36, 38, e.g., fixed to the sills 36, 38. For example, the vehicle floor 14 may include a rear cross member 42, as shown in FIGS. 1-3B, 8. The rear cross member 42 may be supported by the sills 36, 38. The vehicle floor 14 may include panels (not numbered) between the cross members, e.g., between the seat cross member 40 and the rear cross member 42.

The seat cross member 40 and the rear cross member 42 may be designed to absorb energy during the vehicle impact. In other words, the seat cross member 40 and the rear cross member each have a size, shape, material type, and/or interaction with other vehicle components, etc., to absorb the forces applied by the seat 20 and the retractor 22 during vehicle impact. FIG. 1 shows two seats 20, one seat 20 located in a front passenger position and the other seat 20 in a front driver position. The seat 20 shown in FIGS. 2, 8-13 is located in a front driver seat position. Alternatively, or in addition, the seat may be located in any suitable position of the vehicle. In other words, the vehicle 12 may include any suitable number of seats 20 each a component of separate vehicle seating systems 10, 10'.

The vehicle seating system 10, 10' includes the fixed ring 16. The fixed ring 16 is fixed to the vehicle floor 14, i.e., the fixed ring 16 has a direct connection to the vehicle floor 14 and does not move relative to the vehicle floor 14. For example, as shown in FIGS. 1-3B, 8, the fixed ring 16 may be fixed to the seat cross member 40 and/or the rear cross member 42. Alternatively, the fixed ring 16 may be fixed to any suitable part of the vehicle floor 14. The fixed ring 16 absorbs loads from the rotatable ring 18, e.g., during the vehicle impact, and transfers loads to the vehicle floor 14.

The vehicle seating system 10, 10' includes the rotatable ring 18. The rotatable ring 18 is concentric with the fixed ring 16, i.e., the fixed ring 16 and the rotatable ring 18 share a common center point. The rotatable ring 18 is rotatably supported by the fixed ring 16. The rotatable ring 18 rotates relative to the fixed ring 16, allowing the seat 20 to rotate relative to the fixed ring 16. As shown in FIGS. 1-3B and 6-8, the rotatable ring 18 may be disposed interior to the fixed ring 16, i.e., an outer surface of the rotatable ring 18 may engage an interior surface of the fixed ring 16. Alternatively, the rotatable ring 18 may be disposed exterior to the fixed ring 16, i.e., an inner surface of the rotatable ring 18 may engage an exterior surface of the fixed ring 16. The rotatable ring 18 includes a hole 44.

The vehicle seating system 10, 10' may include a motor 46, as shown in FIGS. 3A-3B. The motor 46 rotates the rotatable ring 18 relative to the fixed ring 16. The occupant may actuate the motor 46 to rotate the rotatable ring 18, rotating the seat 20 to a desired position. Alternatively, not shown in the Figures, the vehicle seating system 10, 10' may include a manual device that rotates the rotatable ring 18 relative to the fixed ring 16.

Figure 4:
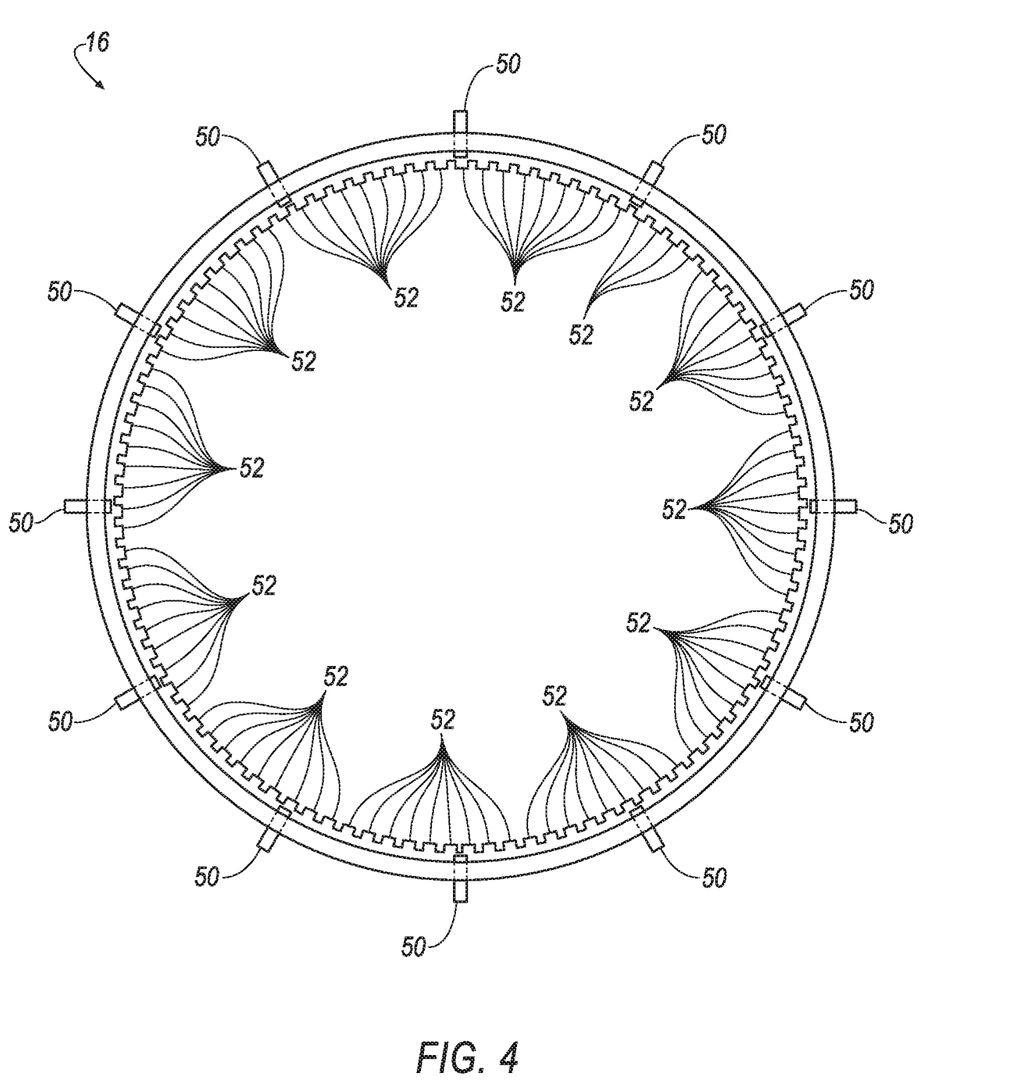
FIG. 4 is a plan view of the fixed ring.
Figure 5:
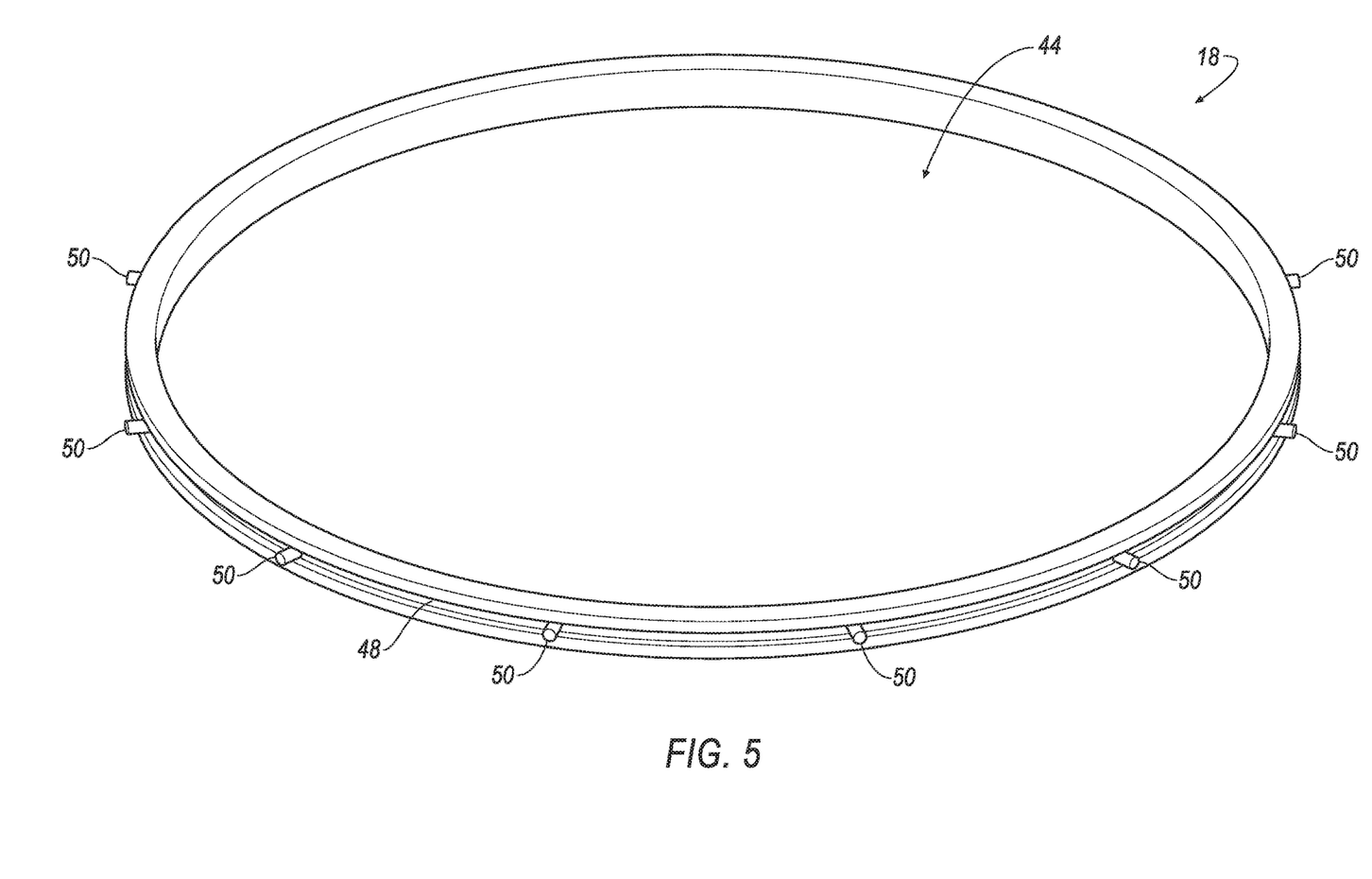
FIG. 5 is a perspective view of the rotatable ring.

One of the fixed ring 16 and the rotatable ring 18 may define a groove 48 and the other of the fixed ring 16 and the rotatable ring 18 may include a pin 50 extending into the groove 48. As shown in FIGS. 4-5, the rotatable ring 18 may define the groove 48 and the fixed ring 16 may include the pin 50 extending into the groove 48. The pin 50 connects the fixed ring 16 to the rotatable ring 18. As shown in FIGS. 1-5, 8, the fixed ring 16 may include a plurality of pins 50. FIG. 5 shows the groove 48 of the rotatable ring 18 receiving the pins 50 from the fixed ring 16. When the pins 50 extend into the groove 48, the rotatable ring 18 rotates along the pins 50 while the pins 50 secure the rotatable ring 18 vertically relative to the fixed ring 16. The pins 50 may extend to the groove 48 in a suitable manner. For example, the pins 50 may be spring-loaded, i.e., the pins 50 may each include a spring (not shown) that pushes the respective pin 50 into the groove 48.

One of the fixed ring 16 and the rotatable ring 18 may have a plurality of teeth 52 and the other of the fixed ring 16 and the rotatable ring 18 may include a tab 54 releasably engageable with the teeth 52. As shown in FIGS. 3A-7, the fixed ring 16 may have the plurality of teeth 52. The teeth 52 extend from an inner surface of the fixed ring 16. For example, the teeth 52 may extend from the inner surface of the fixed ring 16 such that the fixed ring 16 may have an L-shaped cross-section. As shown in FIGS. 3A-3B and 6-7, the rotatable ring 18 may include the tab 54. The teeth 52 are disposed around an interior surface of the fixed ring 16. Two adjacent teeth 52 define a gap 56 therebetween.

Figure 6:
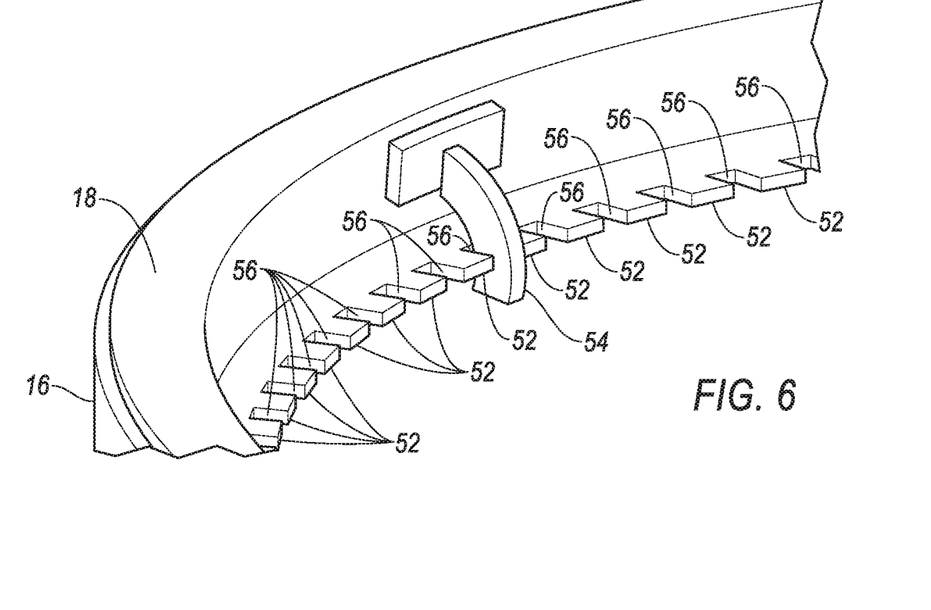
FIG. 6 is a magnified view of a tab securing the rotatable ring to the fixed ring.
Figure 7:
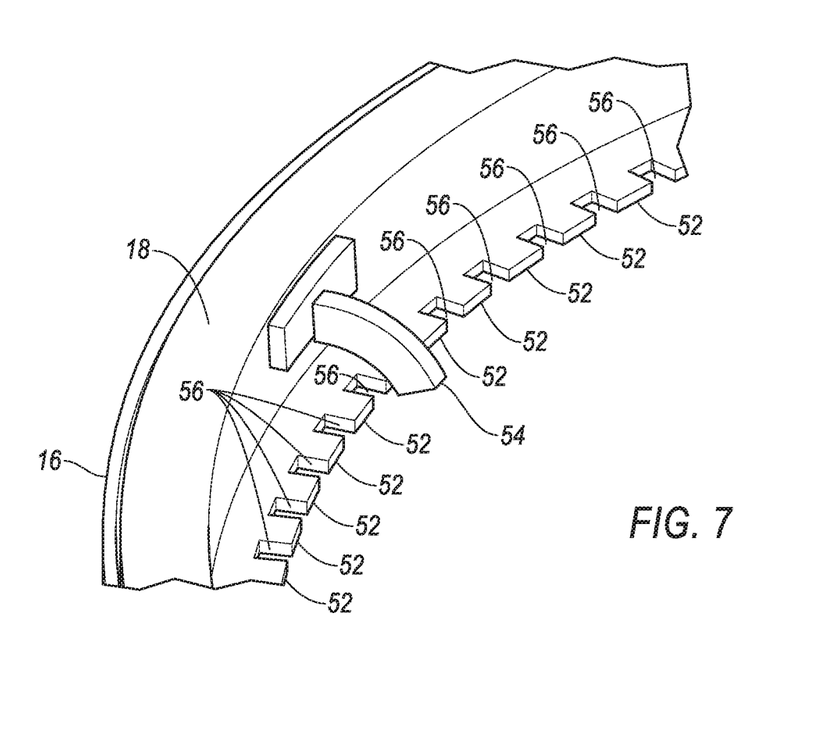
FIG. 7 is a magnified view of the tab disengaged from the fixed ring.
Figure 8:
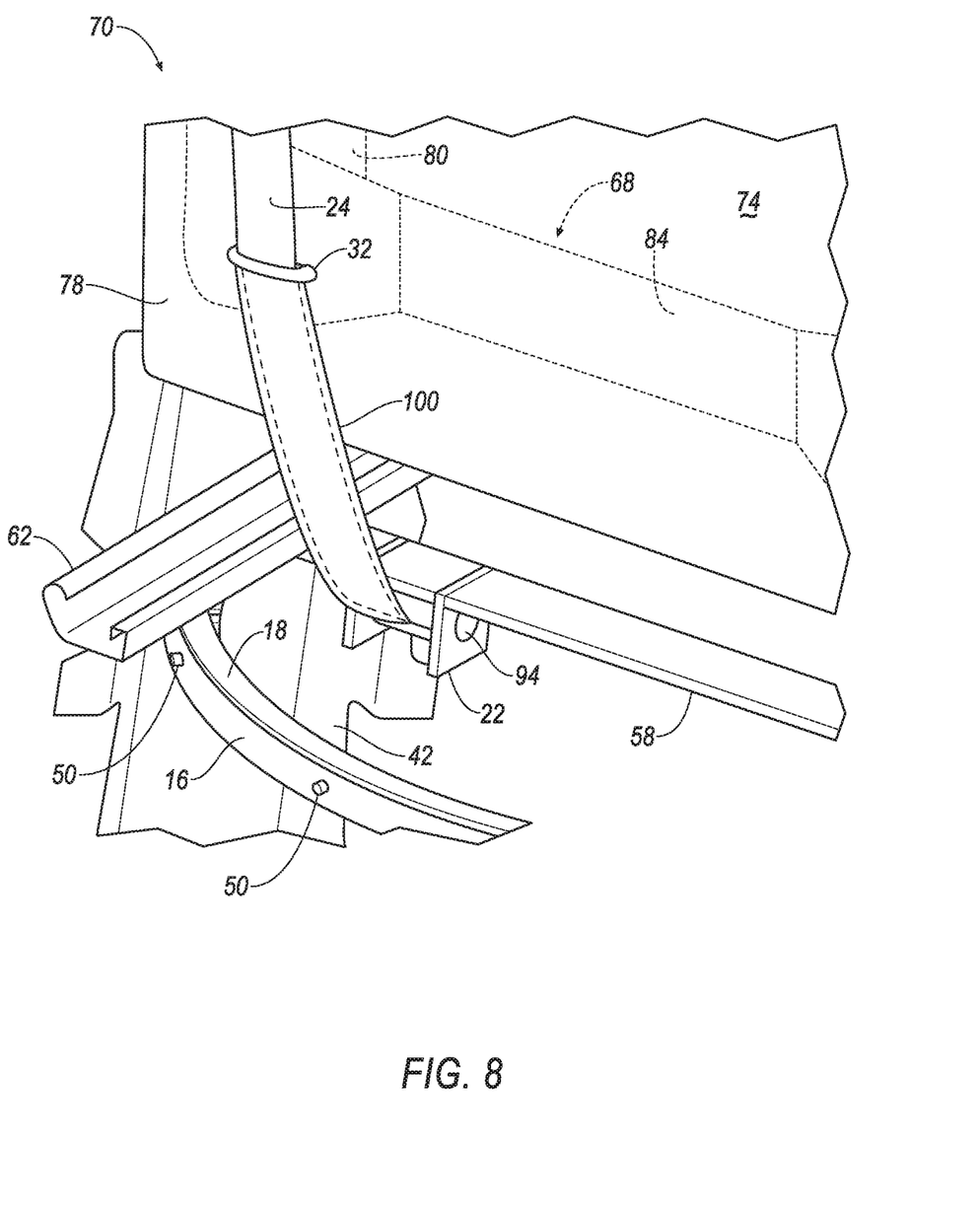
FIG. 8 is a view of the second webbing guide, a retractor, and webbing extending from the retractor to the second webbing guide.
Figure 9:
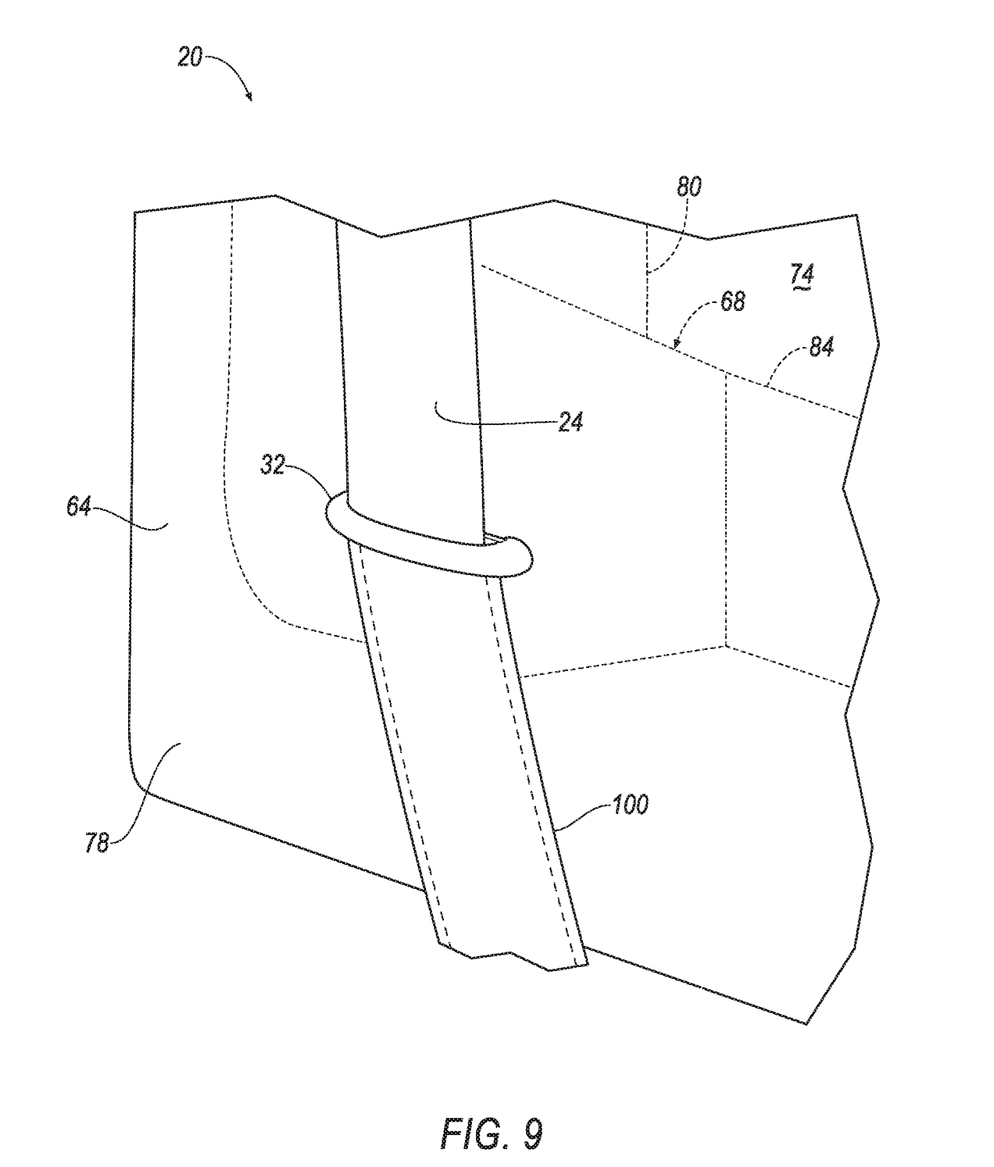
FIG. 9 is a view of the second webbing guide at a bottom of the seat.

The tab 54 is designed to prevent movement of the rotatable ring 18 relative to the fixed ring 16. As shown in FIG. 6, the tab 54 may extend into one of the gaps 56 between two of the teeth 52. When the tab 54 is in one of the gaps 56 and the rotatable ring 18 rotates, the tab 54 engages one of the teeth 52 defining the gap 56, preventing movement of the rotatable ring 18. Thus, the tab 54 secures the rotatable ring 18 relative to the fixed ring 16, securing the seat 20 at a position defined by the gap 56 in which the tab 54 is disposed. Upon rotating the seat 20 to a desired position, the occupant may move the tab 54 into one of the gaps, preventing rotation of the rotatable ring 18. For example, the tab 54 may be a spring-loaded tab, and the occupant may actuate a solenoid actuator to move the tab 54 into one of the gaps 56. Alternatively, the occupant may actuate a manual actuator, e.g., a lever, to move the tab 54 into one of the gaps 56.

The vehicle seating system 10, 10' may include a bar 58, as shown in FIGS. 1-3B, 8. The bar 58 is fixed to the rotatable ring 18. That is, the bar 58 has a direct connection to the rotatable ring 18 and does not move relative to the rotatable ring 18. The bar 58 extends across the hole 44 of the rotatable ring 18. The bar 58 is fixed to the rotatable ring 18 with a suitable connection, e.g., a weld, a fastener, etc. The bar 58 is connected to the seat 20, as described below. The bar 58 absorbs loads from the seat 20, e.g., during the vehicle impact, and may transfer loads from the seat 20 to the rotatable ring 18. The retractor 22 may be fixed to the bar 58, and the bar 58 may transfer loads from the retractor 22 (e.g., from the occupant pulling on webbing 24 connected to the retractor 22) to the rotatable ring 18.

The vehicle seating system 10' may include a second bar 60, as shown in FIG. 3B. The second bar 60 may be transverse to the bar 58. The second bar 60 may be fixed to the bar 58 and to the rotatable ring 18. As shown in FIG. 3B, a portion of the second bar 60 may be fixed to a first side of the bar 58 and a second portion of the second bar 60 may be fixed to a second side of the bar 58 opposite the first side of the bar 58. Alternatively, the second bar 60 may be fixed to the bar 58 and to the rotatable ring 18 in a suitable arrangement. The second bar 60 may be connected to the seat 20. The second bar 60 may transfer loads from the seat 20 to the rotatable ring 18. The bar 58 and the second bar 60 may be fixed to the rotatable ring 18 to transfer loads from the seat 20 and from the retractor 22 to the rotatable ring 18. The vehicle seating system 10, 10' may include a plurality of bars 58, 60 fixed to the rotatable ring 18 to transfer loads from the seat 20 and from the retractor 22 to the rotatable ring 18. As an example not shown in the Figures, the bars 58, 60 may be arranged as a truss to transfer the loads from the vehicle impact. The truss may be designed to transfer the loads from the seat 20 and the retractor 22 to the rotatable ring 18.

The vehicle seating system 10, 10' may include a track 62. The track 62 supports the seat 20 on the rotatable ring 18. The seat 20 is selectively slidable relative to the track 62. That is, the occupant may slide the seat 20 along the track 62 and may secure the seat 20 to the track 62 at a selected position. For example, the occupant may actuate a motor (not shown) that moves the seat 20 along the track 62. The track 62 may be supported by the rotatable ring 18. For example, the track 62 may be fixed to the rotatable ring 18. The track 62 may be supported by the bar 58. During the vehicle impact, the track 62 transmits loads from the seat 20 to the bar 58 and to the rotatable ring 18, reducing loads absorbed by the seat 20. The track 62 has a width W. To support the track 62, the fixed ring 16 and the rotatable ring 18 may have respective diameters based on the width W.

As shown in FIGS. 1-2 and 8-13, the vehicle seating system includes the seat 20. The seat 20 is supported on the rotatable ring 18. As shown FIGS. 1-2 and 8, both the retractor 22 and the seat 20 may be supported by the rotatable ring 18. In other words, during a vehicle impact, the rotatable ring 18 both supports the seat 20 and absorbs forces from the retractor 22 resulting from the webbing 24 being pulled by the occupant. The rotatable ring 18 transfers forces from the retractor 22 and the seat 20 to the fixed ring 16. In such an example, the rotatable ring 18 is the common feature that performs both of these functions.

The seat 20 may include a seat back 64 and a seat bottom 66. The seat back 64 may be supported by the seat bottom 66 and may be stationary or movable relative to the seat bottom 66. The seat back 64 and the seat bottom 66 may be adjustable in multiple degrees of freedom. The seat bottom 66 is selectively slidable along the track 62. That is, the occupant may slide the seat bottom 66 relative to the track 62 to a selected position along the track 62.

The seat bottom 66 and/or the seat back 64 may include a frame 68 and a covering 70 supported on the frame 68. The frame 68 may include tubes, beams, etc. The frame 68 may be formed of any suitable plastic material, e.g., carbon fiber reinforced plastic (CFRP), glass fiber-reinforced semi-finished thermoplastic composite (organosheet), etc. As another example, some or all components of the frame 68 may be formed of a suitable metal, e.g., steel, aluminum, etc.

The covering 70 of the seat may include upholstery and padding. The upholstery may be formed of cloth, leather, faux leather, or any other suitable material. The upholstery may be stitched in panels around the frame. The padding may be between the covering 70 and the frame 68 and may be foam or any other suitable material. The covering 70 may present a class-A surface.

Figure 10:
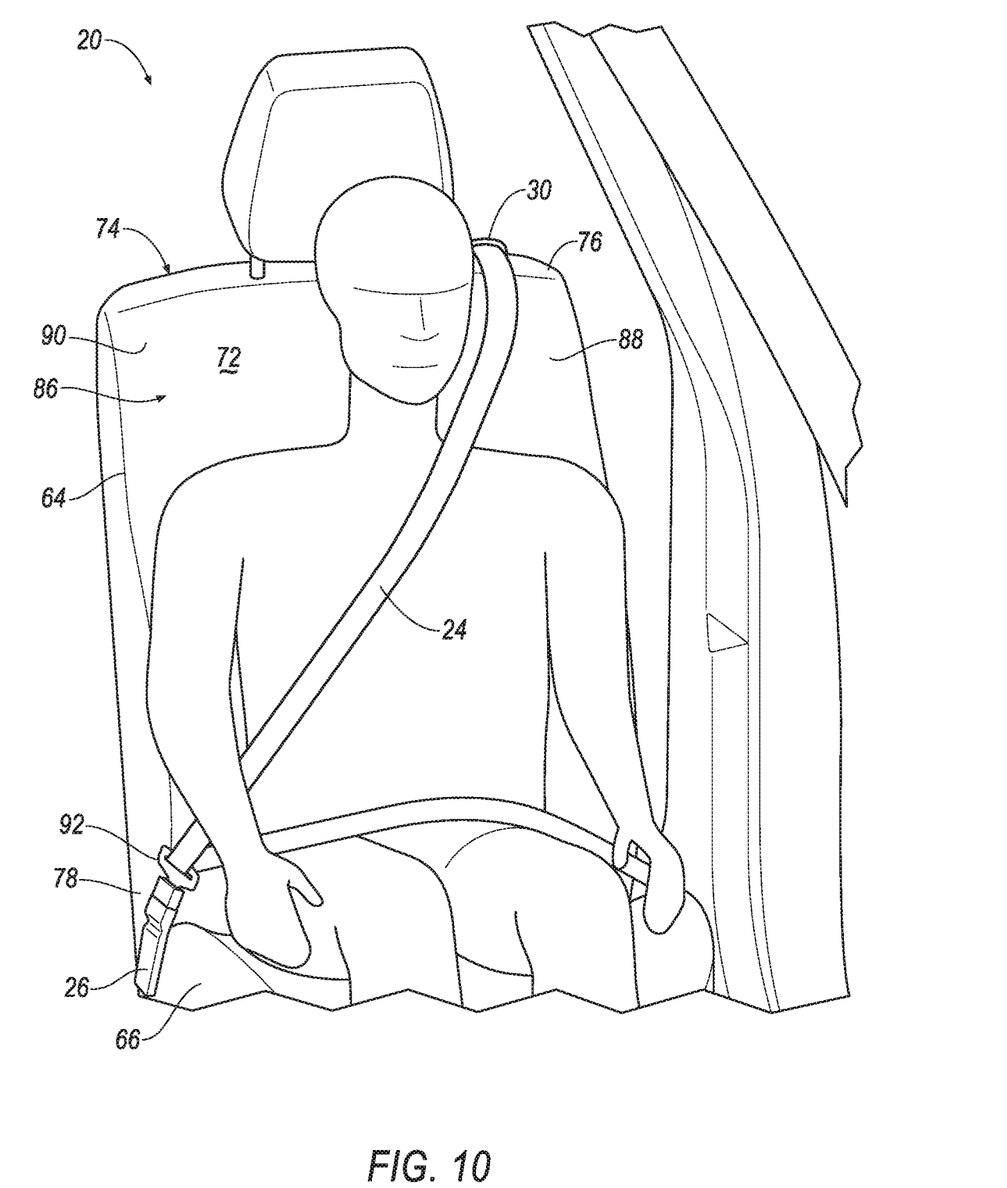
FIG. 10 is a front view of the seat.

The seat back 64 may have a front side 72 and a back side 74, as shown in FIGS. 2 and 10-13. The front side 72 may be designed to support the occupant, as shown in FIG. 10. The back side 74 may be disposed opposite the front side 72. The seat back may have a top 76 and a bottom 78, as shown in FIGS. 2 and 8-13. The top 76 may be the uppermost portion of the seat back 64.

Figure 11:
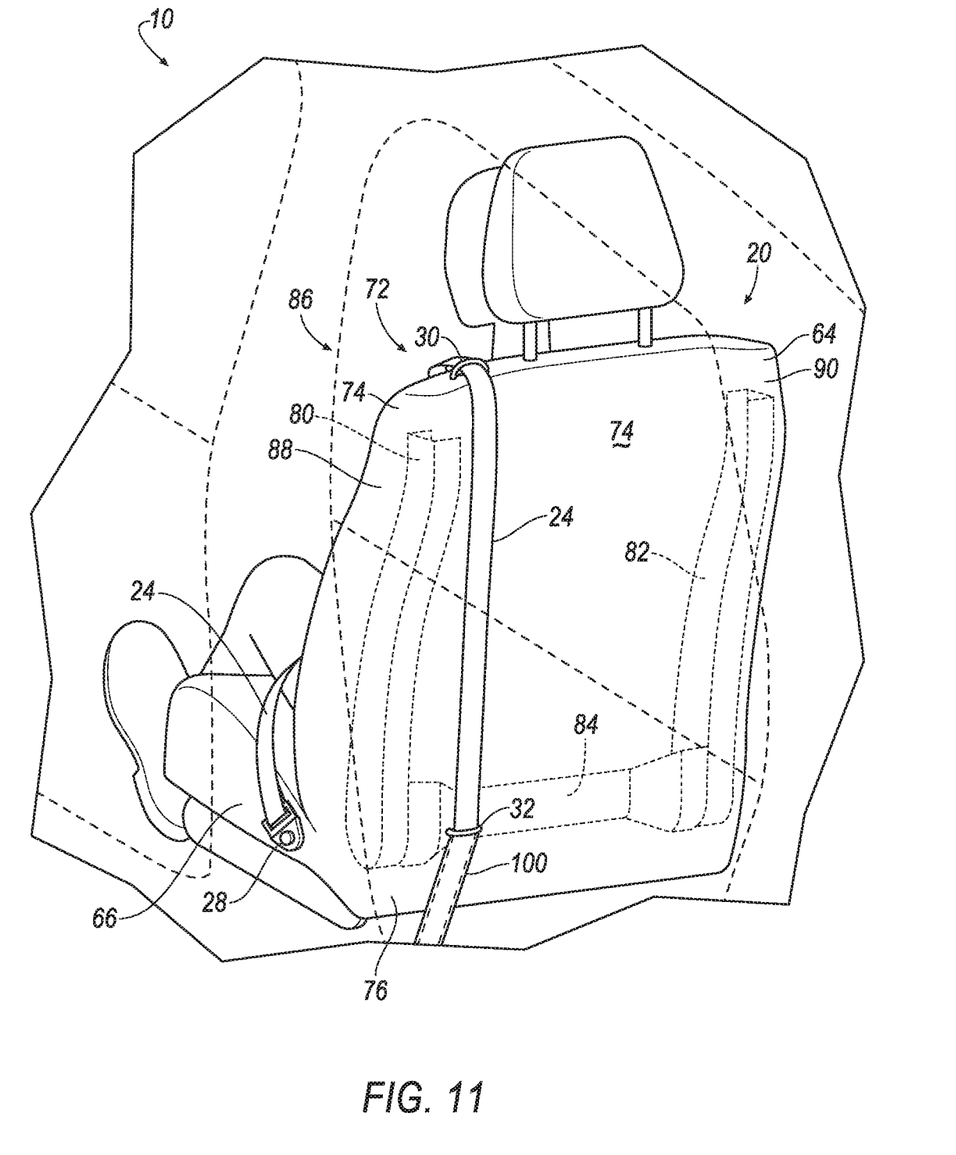
FIG. 11 is a rear perspective view of an anchor on the seat.

The frame 68 of the seat back may include a first member 80 and a second member 82 each elongated vertically, as shown in FIGS. 2, 8-9, and 11. The frame 68 may include a third member 84 extending between the first member 80 and the second member 82. The first member 80 and the second member 82 may be the outermost portion of the frame 68. The frame 68 may include an occupant seating area 86 between the first member 80 and the second member 82, as shown in FIGS. 2 and 10-11. The occupant may be disposed in the occupant seating area 86.

The seat 20 may include side bolsters 88, 90 on opposite sides of the seat 20, as shown in FIGS. 2 and 10-11. The side bolsters 88, 90 may each include the frame 68, the covering 70, and cushioning therebetween. Specifically, one side bolster 88 includes the first member 80 of the frame 68 and the other side bolster 90 includes the second member 82 of the frame 68. The side bolsters 88, 90 may support the occupant in the cross-vehicle direction. In other words, the side bolsters 88, 90 abut the shoulders and/or sides of the occupant and/or may nest the occupant between the side bolsters 88, 90.

As shown in FIGS. 1-2 and 10-11, the webbing 24 is mounted to the seat 20 at at least three mounting points. That is, the webbing 24 has a direct connection to the seat 20 at at least three mounting points and at least a portion of the webbing 24 may move relative to the seat 20. For example, the webbing 24 shown in the Figures is mounted at the retractor 22, the buckle 26, and the anchor 28 as a three-point harness. The webbing 24 may carry a tongue 92, as shown in FIG. 10, for releasably engaging the buckle 26.

The vehicle seating system 10, 10' includes the buckle 26, as shown in FIG. 10. The buckle 26 is rotatably mounted to the seat 20, e.g., to the seat bottom 66. That is, the buckle 26 may rotate relative to the seat 20. The buckle 26 may rotate with the seat 20 when the rotatable ring 18 rotates the seat 20. The occupant may engage the tongue 92 to the buckle 26, securing the webbing 24 to the buckle 26.

The vehicle seating system 10, 10' includes the anchor 28, as shown in FIG. 11. The anchor 28 mounts the webbing 24 to the seat 20. That is, the anchor 28 mounts a portion of the webbing 24 to the seat 20. For example, the anchor 28 may rotatably mount the webbing 24 to the frame 68. The anchor 28 may mount the webbing 24 to the seat 20 with a suitable fastener, e.g., a bolt, a screw, etc. The anchor 28 rotates with the seat 20 when the rotatable ring 18 rotates the seat 20.

The vehicle seating system 10, 10' includes the retractor 22, as shown in FIGS. 1-3B and 8. The retractor 22 stores and deploys the webbing 24. The retractor 22 may include a rotatable core 94 that rotates when the occupant pulls on the webbing 24, allowing payout of the webbing 24. When the occupant releases the webbing 24, the rotatable core 94 retracts, i.e., rotates to spool the webbing 24 about the rotatable core 94. During the vehicle impact, the retractor 22 may lock the webbing 24, preventing payout of the webbing 24.

The retractor 22 is fixed to the rotatable ring 18. That is, the retractor 22 has a direct connection to the rotatable ring 18 and does not move relative to the rotatable ring 18. The retractor 22 is disposed beneath the seat 20, e.g., fixed to the rotatable ring 18 beneath the seat 20. This configuration creates an advantageous routing of the webbing 24, as described below, to prevent the webbing 24 from twisting or roping.

The vehicle seating system 10, 10' includes a first webbing guide 30 and a second webbing guide 32, as shown in FIGS. 1-2 and 8-13. The first webbing guide 30 is supported by the seat 20. The second webbing guide 32 is supported by the seat 20. The second webbing guide 32 may be spaced from the first webbing guide 30. The webbing 24 extends from the retractor through the first webbing guide 30 and the second webbing guide 32. Specifically, the webbing 24 extends from the retractor 22 through the second webbing guide 32 to the first webbing guide 30, as shown in FIG. 2. The webbing 24 may extend vertically from the second webbing guide 32 to the first webbing guide 30. The webbing 24 may extend from the second webbing guide 32 to the retractor 22 in a vehicle-forward direction. The webbing guides 30, 32 being supported by the seat 20 route the webbing 24 to prevent the webbing 24 from twisting or roping, for example, during a vehicle oblique impact that pulls the webbing 24 in both vehicle-forward direction and a cross-vehicle direction.

The first webbing guide 30 and the second webbing guide 32 are supported by the seat back 64. For example, the first webbing guide 30 and/or the second webbing guide 32 may be supported by the side bolster 88 as shown in FIGS. 2 and 11. Specifically, the first webbing guide 30 and/or the second webbing guide 32 may be fixed to the seat back 64. For example, the webbing guide 30 and/or the second webbing guide 32 may be directly connected to the seat back 64 by, e.g., fasteners, welding, etc. For example, the first webbing guide 30 and/or the second webbing guide 32 may be fixed to the first member 80. The first webbing guide 30 and/or the second webbing guide 32 may be fixed to the frame 68 and may extend through the covering 70. Specifically, the first webbing guide 30 and/or the second webbing guide 32 may be fixed to the back side 74 of the seat back 64. The webbing 24 extends from the from the first webbing guide 30 to the front side 72 of the seat back 64.

The first webbing guide 30 may be supported by the seat back 64 at the top 76 of the seat back 64. The second webbing guide 32 may be supported by the seat back 64 at the bottom 78. The webbing 24 may extend from the bottom 78 of the seat back 64 through the second webbing guide 32 to the top 76 of the seat back 64 and through the first webbing guide 30.

The webbing 24 may extend vertically along the first member 80 from the first webbing guide 30 to the second webbing guide 32. In other words, the webbing 24 extends vertically along the side bolster 88.

Figure 12:
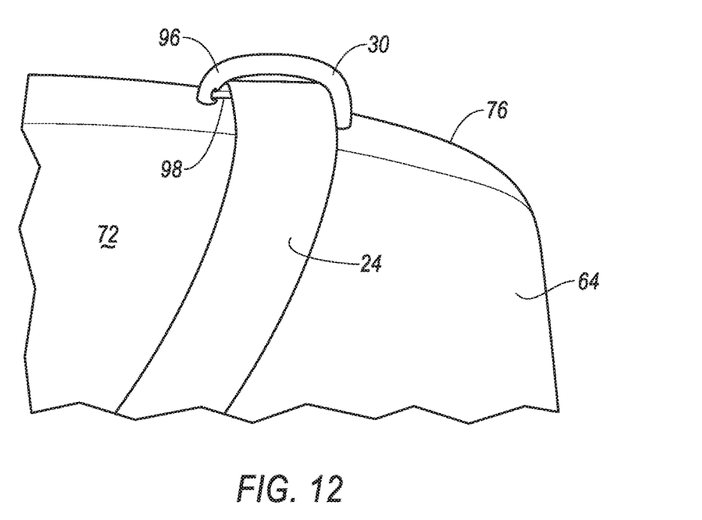
FIG. 12 is a front view of the first webbing guide with webbing therethrough.
Figure 13:
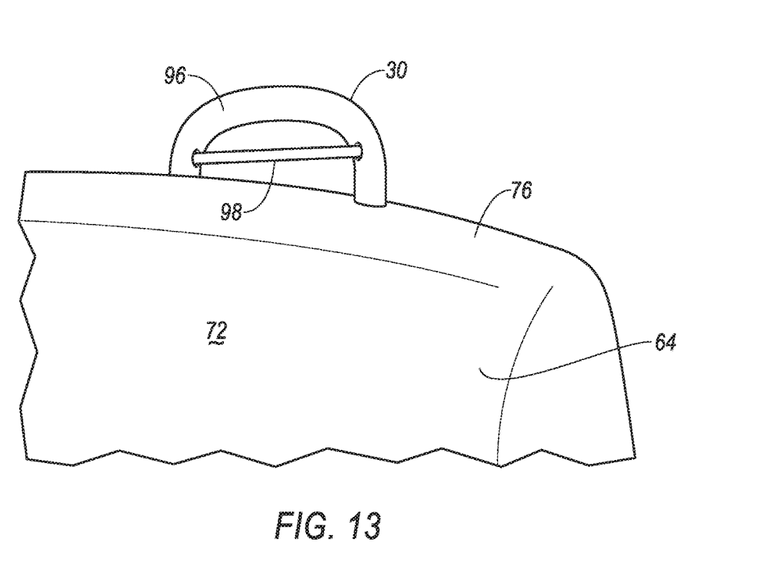
FIG. 13 is a front view of the first webbing guide with the webbing removed.

The first webbing guide 30 may include a frame 96 and a roller 98, as shown in FIGS. 12-13. The frame 96 may be fixed to the seat back 64. The roller 98 may be rotatably attached to the frame 96. The webbing 24 may ride on the roller, as shown in FIG. 12. As the occupant pulls on the webbing 24, the webbing 24 may engage the roller 98, rolling the roller 98 relative to the frame 96. The roller 98 may include a low-friction coating, e.g., tetrafluoroethylene, graphite, silicone, etc. The low-friction coating may allow the webbing 24 to ride on the roller 98 while losing less energy to the roller 98 from friction.

The vehicle seating system 10, 10' may include a sleeve 100, as shown in FIGS. 2, 8-9, and 11. The sleeve 100 may extend from the retractor 22 to the second webbing guide 32. The webbing 24 may extend through the sleeve 100 between the retractor 22 and the second webbing guide 32. The sleeve 100 may be fixed relative to the retractor 22 and the second webbing guide 32. As an example, the sleeve 100 may be fixed to the frame 68 of the seat back 64, e.g., by unitary construction, adhesive, fasteners, etc. As another example, the sleeve 100 may be fixed to another component, e.g., the second webbing guide 32. The sleeve 100 may guide and/or protect the webbing 24 moving between the retractor 22 and the second webbing guide 32. The sleeve 100 may be, for example, plastic.

During the vehicle impact, the retractor 22, fixed to the rotatable ring 18, transmits loads from the occupant pulling on the webbing 24 to the rotatable ring 18. The rotatable ring 18 transmits the loads to the fixed ring 16, and the fixed ring 16 transmits the loads to the vehicle floor 14. The rotatable ring 18, the fixed ring 16, and the retractor 22 thus reduce loads absorbed by the seat 20.

Specifically, the webbing 24 extends from the retractor 22 to the second webbing guide 32. The second webbing guide 32 routes the webbing 24 to the first webbing guide 30. The webbing 24 exits the first webbing guide 30 across the front side 72 of the seat back 64. During the vehicle impact, the retractor 22 locks to prevent or limit payout of the webbing 24 from the retractor 22. The momentum of the occupant applies a load to the webbing 24. This routing of the webbing 24 prevents the webbing 24 from twisting or roping, as described above, and delivers the forces from the webbing 24 to the retractor 22 to the rotatable ring 18.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order.

Many modifications and variations of the present disclosure are possible in light of the above teachings, and the disclosure may be practiced otherwise than as specifically described.

What is claimed is:

1. A vehicle seating system, comprising:
a vehicle floor;
a fixed ring fixed to the vehicle floor and a rotatable ring concentric with and rotatably supported by the fixed ring;
a seat supported on the rotatable ring; and
a retractor fixed to the rotatable ring.

2. The vehicle seating system of claim 1, further comprising a bar fixed to the rotatable ring and the retractor is fixed to the bar.

3. The vehicle seating system of claim 2, wherein the rotatable ring includes a hole and the bar extends across the hole.

4. The vehicle seating system of claim 2, further comprising a second bar transverse to the bar and fixed to the bar and the rotatable ring.

5. The vehicle seating system of claim 2, wherein the retractor is beneath the seat.

6. The vehicle seating system of claim 1, wherein one of the fixed ring and the rotatable ring has a plurality of teeth and the other of the fixed ring and the rotatable ring includes a tab releasably engageable with the teeth.

7. The vehicle seating system of claim 6, wherein the tab is designed to prevent movement of the rotatable ring relative to the fixed ring.

8. The vehicle seating system of claim 1, further comprising a track supporting the seat on the rotatable ring, the seat being selectively slideable relative to the track.

9. The vehicle seating system of claim 1, wherein one of the fixed ring and the rotatable ring defines a groove and the other of the fixed ring and the rotatable ring includes a pin extending into the groove.

10. The vehicle seating system of claim 1, further comprising a webbing guide supported by the seat and a webbing extending from the retractor through the webbing guide.

11. The vehicle seating system of claim 10, wherein the webbing guide includes a frame and a roller rotatably connected to the frame and the webbing rides on the roller.

12. The vehicle seating system of claim 10, further comprising a second webbing guide supported by the seat spaced from the webbing guide, the webbing extending through the second webbing guide.

13. The vehicle seating system of claim 12, wherein the seat includes a seat back having a top and a bottom, the webbing guide being supported by the top and a second webbing guide being supported by the bottom.

14. The vehicle seating system of claim 13, further comprising a sleeve extending from the second webbing guide to the webbing guide, the webbing extending through the sleeve.

15. The vehicle seating system of claim 13, wherein the seat back includes a front side designed to support an occupant and a back side opposite the front side, the webbing guide and the second webbing guide being supported by the back side.

16. The vehicle seating system of claim 15, wherein the webbing extends from the webbing guide to the front side of the seat back.

17. The vehicle seating system of claim 13, wherein the seat back includes a frame having a first member and a second member elongated vertically, and an occupant seating area between the first member and the second member, the webbing guide and the second webbing guide being supported by the first member.

18. The vehicle seating system of claim 13, wherein the webbing extends from the second webbing guide to the retractor in a vehicle-forward direction.

* * * * *